PRINTER WITH TYPE WHEEL ROTATABLE IN EITHER DIRECTION

Filed Jan. 10, 1966 5 Sheets-Sheet 1

INVENTOR.
WILLIAM A. REVELLE
BY
[signature]
ATTORNEY.

INVENTOR.
WILLIAM A. REVELLE
BY
[signature]
ATTORNEY.

PRINTER WITH TYPE WHEEL ROTATABLE IN EITHER DIRECTION

Filed Jan. 10, 1966

5 Sheets-Sheet 5

INVENTOR.
WILLIAM A. REVELLE
BY
[signature]
ATTORNEY.

United States Patent Office 3,399,753
Patented Sept. 3, 1968

3,399,753
PRINTER WITH TYPE WHEEL ROTATABLE IN EITHER DIRECTION

William A. Revelle, Gardena, Calif., assignor, by mesne assignments, of sixty-five percent to Theresa Beckman, Compton, ten percent each to John E. Carr, Garden Grove, and Robert Y. Kodama, Buena Park, and fifteen percent to Richard J. Rengel, Rolling Hills Estates, Calif.

Filed Jan. 10, 1966, Ser. No. 519,620
14 Claims. (Cl. 197—49)

ABSTRACT OF THE DISCLOSURE

A printer system comprising electronic logical circuitry including an input register for storing a binary coded representation of a character to be printed and an encoder operatively connected to a print wheel which is scanned to produce a binary coded signal representing the position of the print wheel, i.e. the character in position to be printed. Binary outputs of the input register and the scanned encoder are compared to produce an enabling signal for gating pulses through a sequencer circuit for a stepping motor to move the print wheel in the shortest direction to position the desired character for printing. Upon an equal comparison of the binary outputs the enabling signal for gating the pulses is blocked and an equal comparison signal is produced to cause printing and thereafter cause the print wheel to advance to the next character.

This invention relates to data printing systems and has particular reference to data printing systems of the single print wheel type wherein a print wheel having one or more fonts of type characters spaced therearound is rotatable to present a selected type character at a printing station. Following the printing operation, the type wheel is shifted axially one character space in order to print the next type character of a line of print.

A principal object of the present invention is to provide a single print wheel printing system in which the print wheel is rotated the shortest distance in one direction or the other from one print position to the next.

A further object is to provide a single print wheel system incorporating a closed loop digital servo system for rotating the print wheel into different printing positions.

A further object is to provide a single print wheel system incorporating a print wheel position encoder which is sensed only when in a static condition.

A further object is to provide a high speed serial data printing system utilizing a single print wheel.

A further object is to provide a simple and inexpensive serial data printer capable of being incorporated in a relatively small and compact package.

The manner in which the above and other objects of the invention are accomplished will be readily understood on reference to the following specification when read in conjunction with the accompanying drawings, wherein:

FIG. 7 is a schematic view of another part of the comparison circuit for determining the direction of rotation of the print wheel.

Figures 1, 2, 3:
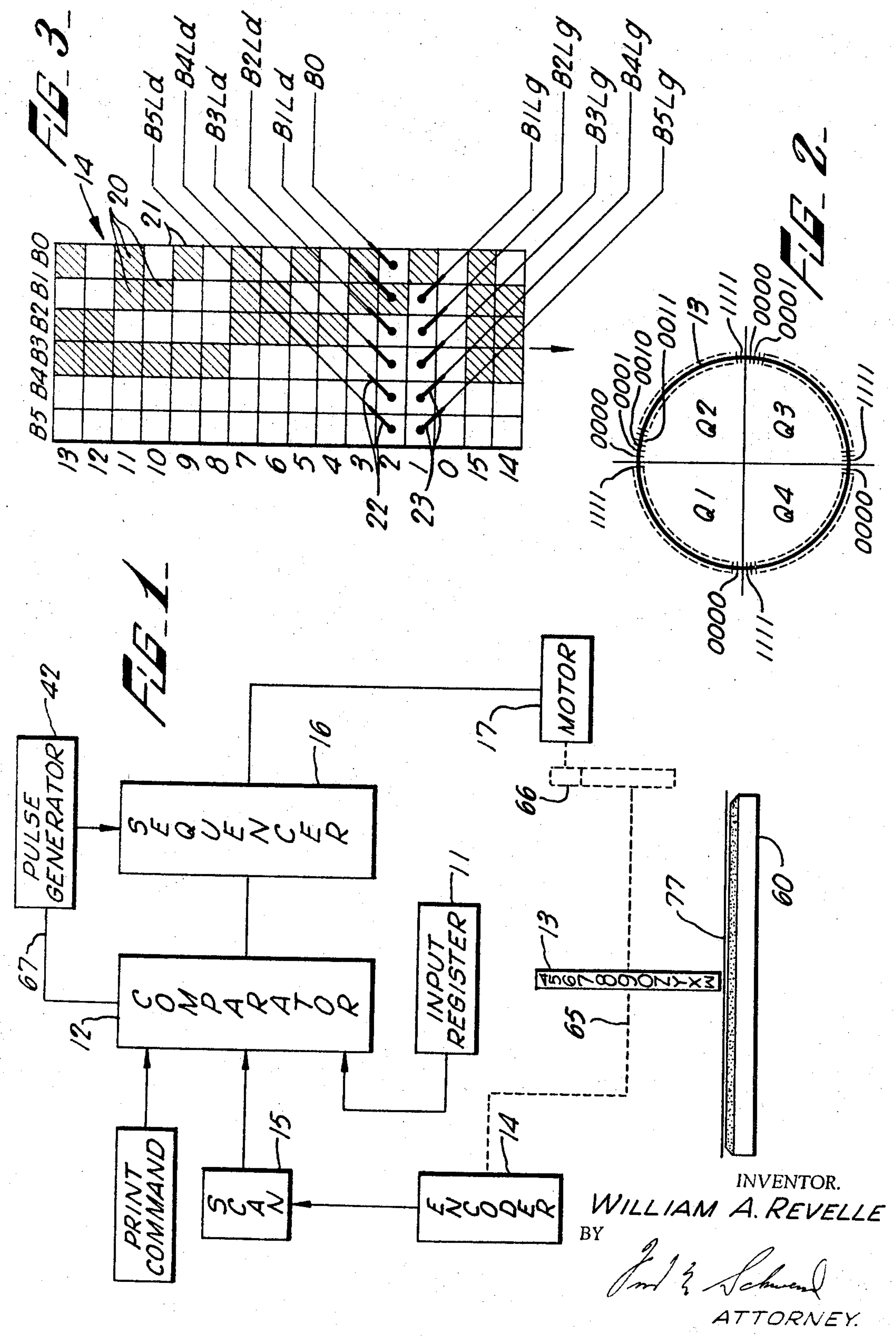
FIG. 1 is a general schematic view of data printing system embodying a preferred form of the present invention.
FIG. 2 is a schematic view illustrating the coding of the different type characters carried by the print wheel.
FIG. 3 is a schematic developed view illustrating the encoder.

Referring particularly to FIG. 1, the print system comprises, in general, a suitable input register or buffer circuit 11 for holding a binary coded representation of a character to be printed. Such data is fed to a comparator circuit 12 which compares the same with the position of a print wheel 13 having one or more fonts of type characters spaced therearound. This is effected through an encoder 14 operatively connected to the print wheel and scanned by a scanning circuit 15 cooperable with the comparator circuit 12. The position of the print wheel is detected by the comparator circuit which determines the appropriate direction which the print wheel must be rotated to arrive at the next printing position with the least amount of travel. A print command circuit, upon being energized, is effective through the comparator circuit 12 to enable a pulse generator 42 to apply stepping pulses to a sequencer circuit 16 to drive a 3-phase incremental or stepping motor 17 in the proper direction. The motor 17 is suitably geared to the print wheel 13 so that during each incremental advance of the motor in one direction or the other the print wheel will be advanced from one type character position to the next. Alternatively, a 3-phase constant speed motor could be substituted for the incremental motor 17.

Referring to FIG. 2, and assuming that the print wheel 13 has 64 type characters spaced therearound, the wheel and rotatable member of the encoder are divided into four quadrants Q1–Q4. The type characters in each quadrant of the wheel 13 are assigned binary coded designations ranging from 0000 to 1111.

The encoder 14, FIG. 3, has a matrix of contacts 20 arranged in six levels or channels in accordance with the binary progression series, there being one line 21 of contacts for each type character position.

A line of lead brushes B0 L*d* to B5 L*d* are located in wiping engagement with the different levels of contacts and are spaced from corresponding lag brushes B1 L*g* to B5 L*g* by one line space so that the lead brushes always sense a line of contacts in advance of the lag brushes. The two leftmost or highermost order brushes B4 L*d*, B5 L*d* and B4 L*g*, B5 L*g* sense a representation of the particular quadrant of the print wheel which is at the printing station at any time. The remaining brushes sense a representation of the particular type character of a quadrant which is at the printing station at such time.

The various brushes of the encoder are sensed by the scan circuit 15 (FIG. 4) and for this purpose the brushes are connected to respectively identified inputs of "nor" gates 22. The outputs of such "nor" gates are paired into another series of "nor" gates 23 whose outputs are identified as terms XN and XN′, ranging from X0 to X5 and X0′ to X5′, which are connected as inputs to a series of "and" gates 24 forming part of the comparator circuit 12.

Input data to be printed is registered in binary form on six flip-flop Y1 to Y6 (FIG. 5) which form a buffer or input register 11. The true and false outputs of such flip-flops are connected over groups of lines 60 and 61, respectively, as second inputs to the "and" gates 24 of FIG. 4. Such input information is identified by the designations Y0 to Y5 and Y0′ to Y5′

Figure 6:
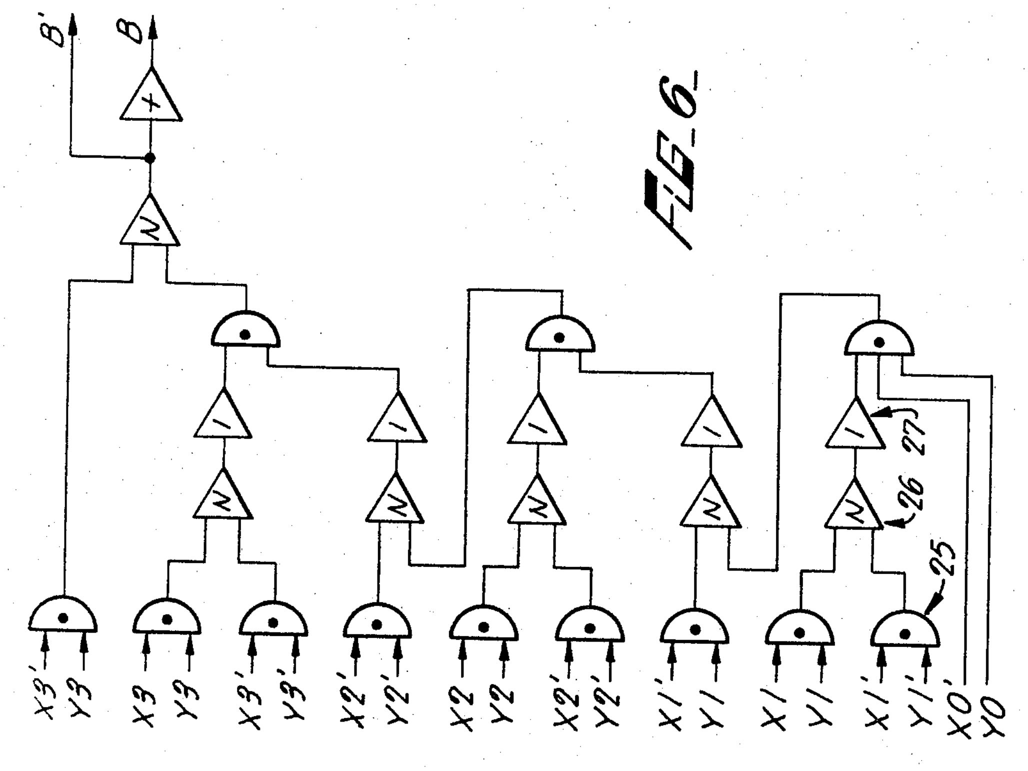
FIG. 6 is a schematic view of part of the comparison circuitry for determining the direction of rotation of the print wheel when advancing from one print position to another.

The various connections forming terms XN, XN′ and YN, YN′ are connected as inputs to a series of "and" gates 25 (FIG. 6). The outputs of such "and" gates are connected through "nor" gates 26 and inverter circuits 27 to form a subtraction circuit which forms a "borrow" expression B or a "non-borrow" expression B′.

Describing the above circuit in terms of a logical equation wherein the term YN assigned to the input binary function$=B$ and $YN'=B'$: "borrow"

$$(B)=X3'Y3(X3Y3X3'Y3')(X2'Y2+(X2Y2+X2'Y2'))(X1'Y'+)(X1Y1+X1'Y1')(X0'X0)$$

The above expressions B and B′ are incorporated in a clockwise-counterclockwise determining circuit of FIG. 7 to determine the direction of rotation of the print wheel. For this purpose, the outputs X4, X4′, X5 and X5′ representing the particular quadrant which is at the printing station and Y4, Y4′, Y5 and Y5′ representing the quadrant in which a selected type character is located, are connected in different combinations to the inputs of a series of "and" gates 28, the outputs of which are paired through "nor" gates 30 and inverter circuits 31 whose outputs are "anded" with each other and, in certain cases, with the terms B and B′ by "and" gates 32, the outputs of which are connected through "nor" gate 33 to obtain the term CCW (counterclockwise). Such term is passed through an inverter circuit 34 to obtain the opposite term CW (clockwise).

Defining the above in terms of a logical equation:

$$CW=(X5'Y5+X5Y5')(X4'Y4+B(X4'Y4'+X4Y4))+(X5Y5+X5'Y5')(X4Y4'+B'(X4'Y4'+X4Y4))$$
$$CCW=(CW)'$$

Figure 4:
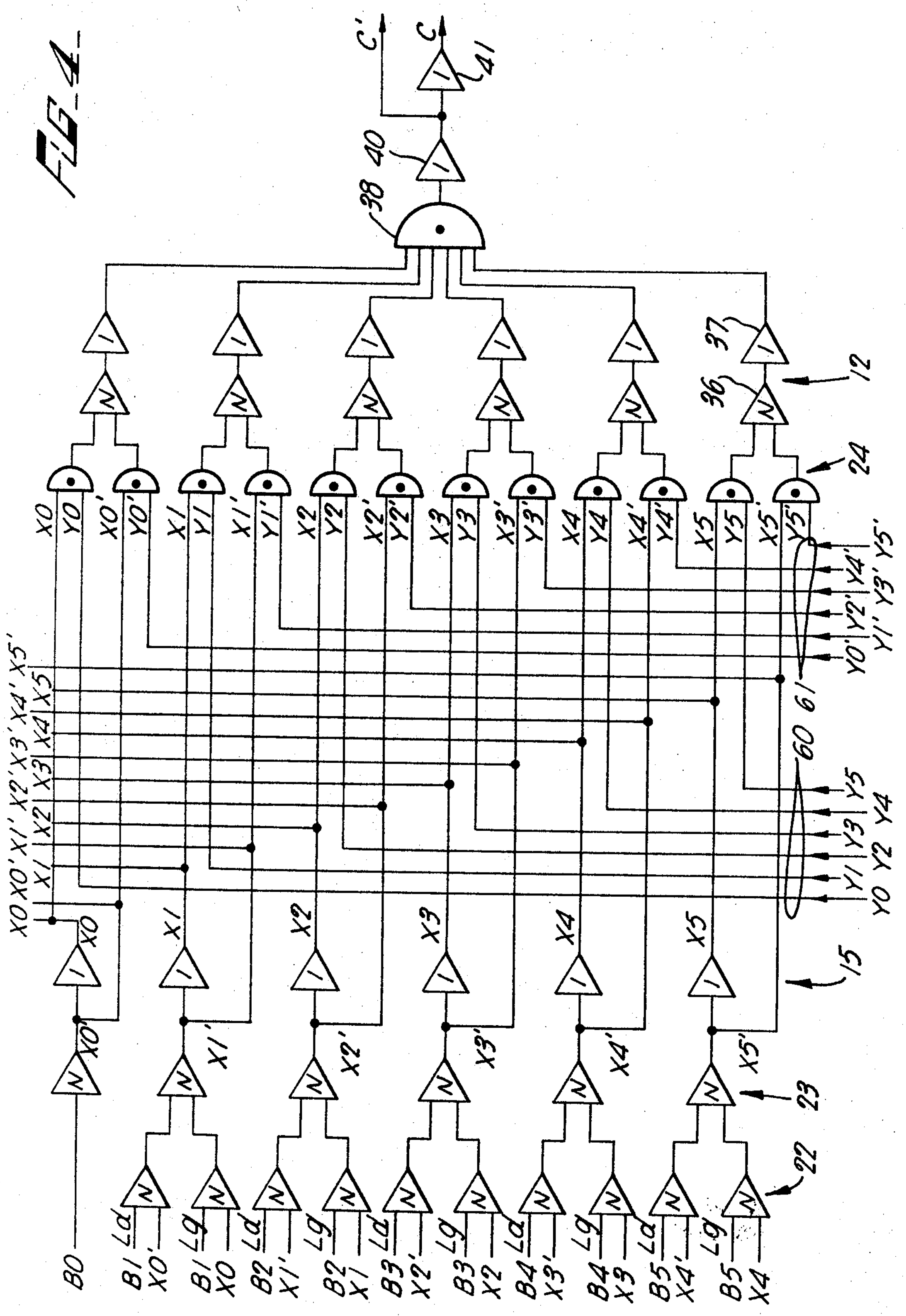
FIG. 4 is a schematic view illustrating the scanning circuit and part of the comparing circuit.
Figure 5:
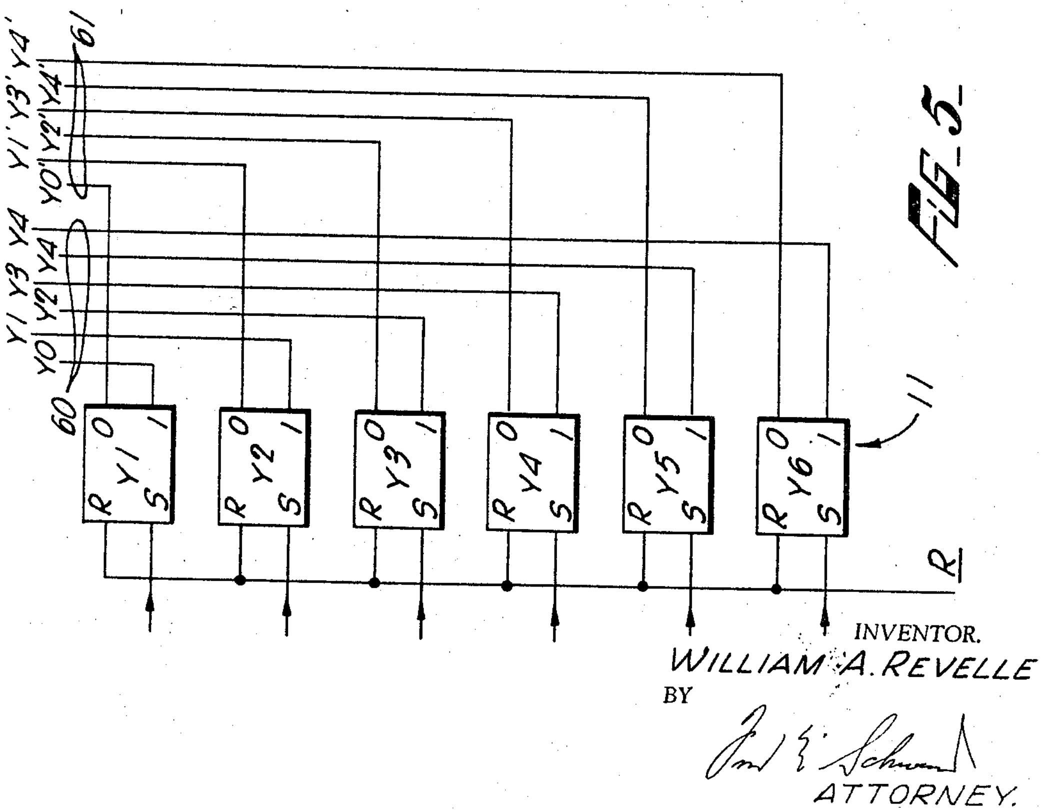
FIG. 5 is a schematic view illustrating an exemplary buffer circuit in which characters to be printed are sequentially registered.

In order to cause the print wheel to continue rotation and to stop when a type character position thereon coincides with the character representation registered by the input register circuit 11, the term C′ (non-coincidence) and C (coincidence) is derived by the comparator circuit 12 of FIG. 4 and for this purpose the outputs of the above described "and" gates 24 are paired through "nor" gates 36, the outputs of which are passed through inverter circuits 37 and connected to corresponding inputs of a six-input "and" gate 38. The output of the latter is passed through an inverter circuit 40 to provide the term C′. Such term is passed through a second inverter circuit 41 to provide the term C.

As will be noted presently, the term C′ maintains the motor 17 in operation in the appropriate direction until receipt of term C which enables the motor to stop and causes a print operation.

Defining the above circuitry in terms of a logical equation:

$$C=(X0Y0+X0'Y0')(X1Y1+X1'Y1')(X2Y2+X2'Y2')(X3Y3+X3'Y3')(X4Y4+X4'Y4')(X5Y5+X5'Y5')$$

The terms C, C′, CW and CCW are applied to correspondingly identified lines of the sequencer circuit 16 (FIG. 8) along with the pulses P derived from the pulse generator 42.

Figure 8:
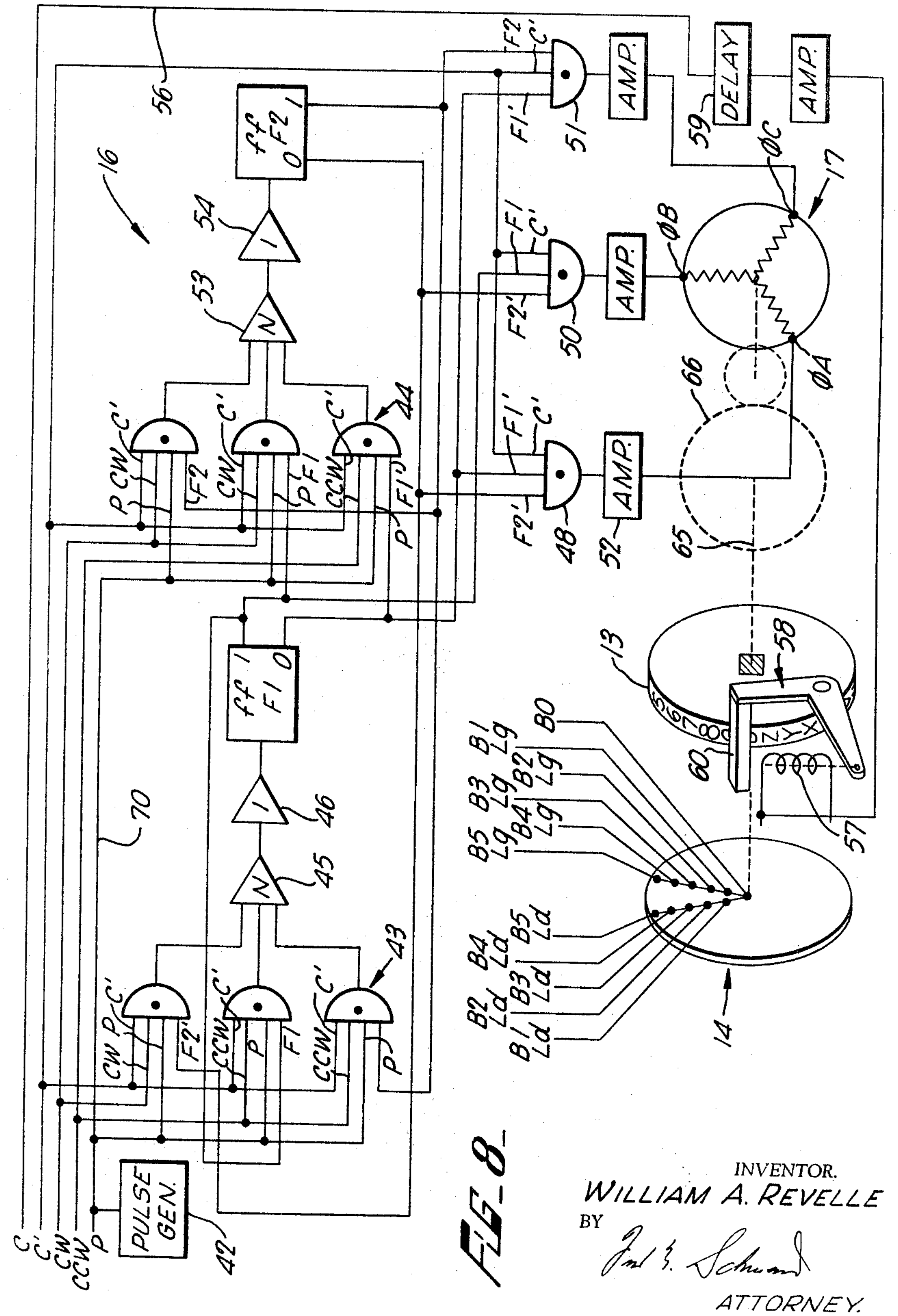
FIG. 8 is a schematic view of the print wheel motor sequencing and drive control.

The lines representing the above terms are applied to the inputs of sets of "and" gates 43 and 44 in the manner shown in FIG. 8.

The outputs of the "and" gates 43 are applied through a "nor" gate 45 and inverter circuit 46 to a toggle type flip-flop F1 whose true (1) and false (0) outputs are connected to the inputs of certain of the sets of gates 43 and 44 and also to certain of a set of three "and" gates 48, 50 and 51. The outputs of the latter gates are connected through driver circuits 52 to respective phase A, phase B and phase C windings of the motor 17.

Likewise, the outputs of the gates 44 are connected through a "nor" gate 53 and inverter circuit 54 to a toggle type flip-flop F2, whose true and false outputs are connected to certain of the inputs of both sets of "and" gates 43 and 44, as well as to certain of the inputs of the gates 48, 50 and 51.

Defining the sequencer circuit in terms of a logic equation:

$$\text{Phase } A=F1'F2'C'$$
$$\text{Phase } B=F1F2'C'$$
$$\text{Phase } C=F1'F2C'$$
$$F1=C'CW \text{ Pulse } F2'+C'F1CCW \text{ Pulse }+C'F2CCW \text{ Pulse}$$
$$F2=F2C'CW \text{ Pulse}+F1C'CW \text{ Pulse}+F1'C'CCW \text{ Pulse}$$

It will be seen from the above description that the comparator and sequencing circuits will determine the appropriate direction of movement of the print wheel 13 and that the motor will be held in operation by application of the term C′ to all of the gates 43 and 44 until the proper type character arrives at the printing station. At such time the term C′ will disappear to close all of the gates 43 and 44, thereby stopping the motor 17. At this time the term C will be applied over line 56 and through a suitable delay circuit 59 to energize solenoid 57 and thereby actuate a print hammer 58. The latter is in the form of a bail including a bail bar 60 which extends across the printer and which is effective, when actuated, to strike a paper or other record medium 77 against a selected type character on the wheel 13 to obtain an impression thereof on the record medium.

The print wheel 13 is splined on a square shaft 65 which is entrained through gearing 66 with the motor 17. Means (not shown) are responsive to the application of the term C, and after a suitable delay to permit printing, are effective to step the print wheel 13 one letter space along its shaft 65 preparatory to printing the next character.

Operation of the printer is initiated by the print command circuit 67 which enables the comparator circuit and the pulse generator 42.

Figure 9:
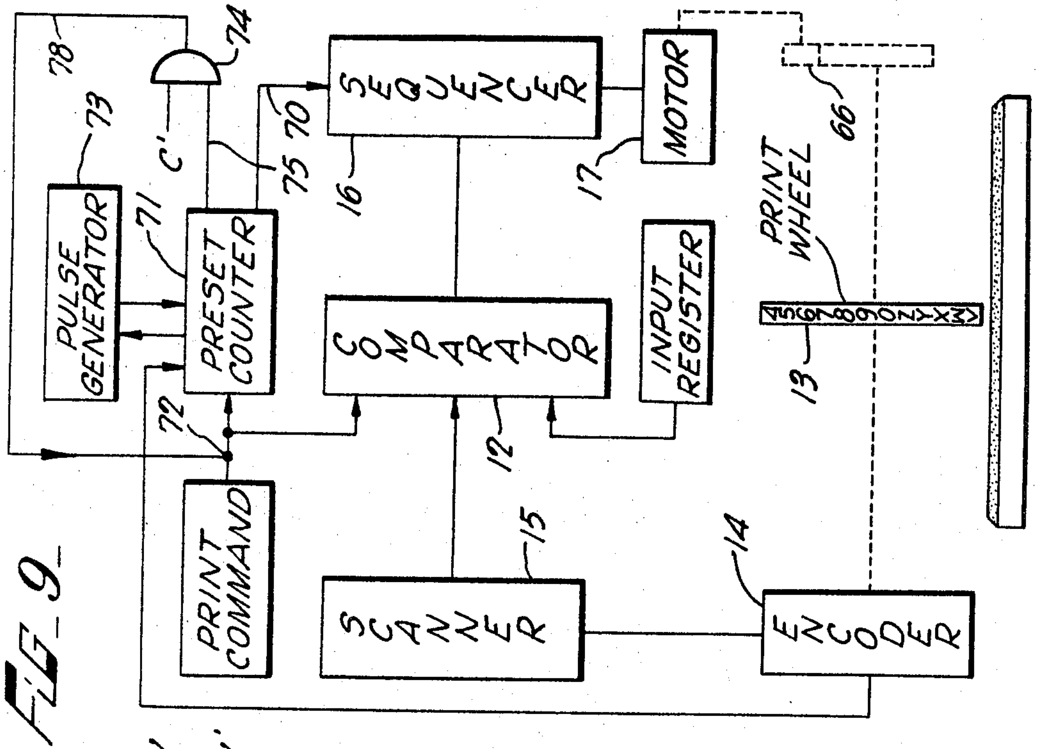
FIG. 9 is a schematic view of a modified form of the invention in which the encoder is scanned while in a static condition.
Figure 2:
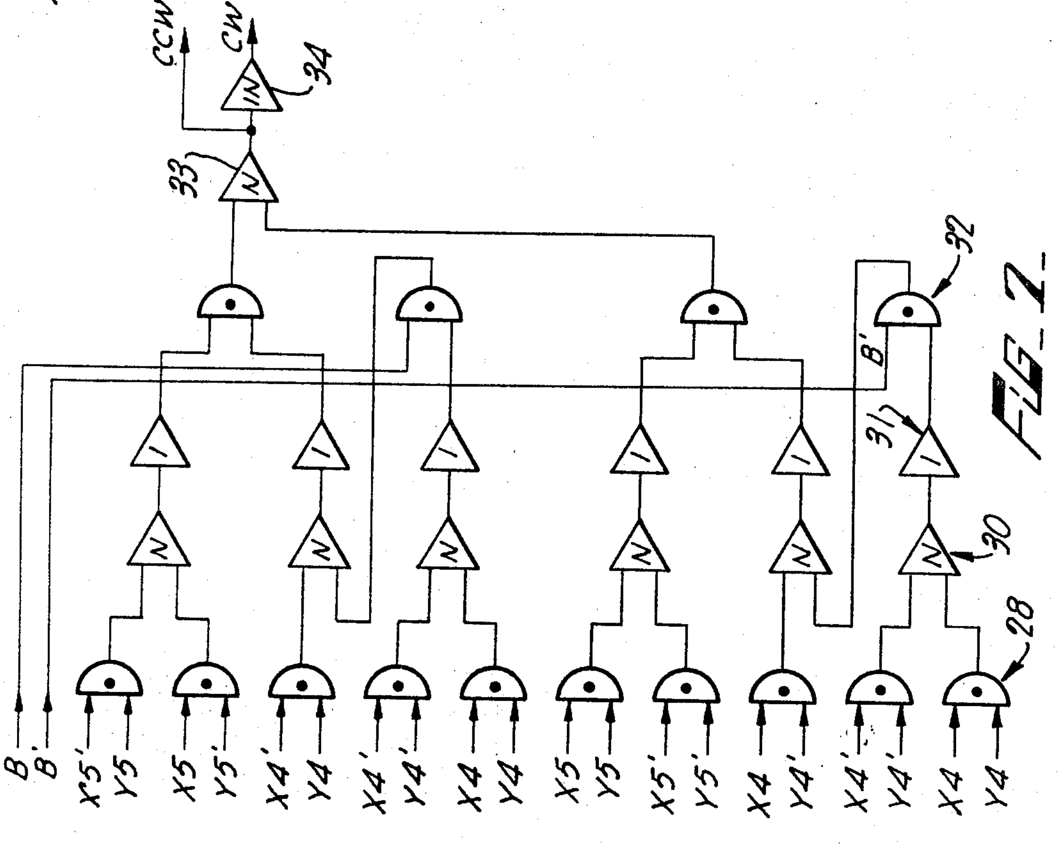

FIG. 9 illustrates a modified form of the invention in which data registered by the encoder 14 and representing the position of the print wheel 13 relative to the bar 60 is initially transferred to a preset counter 71 of conventional design while the type wheel and encoder are stationary, following printing of a previous character. The U.S. patent to R. F. Orr No. 3,035,767 discloses an exemplary counter which with obvious modifications could be employed to perform the functions ascribed to counter 71.

Since the encoder is in a static condition during the transfer of information therefrom, spurious pulses which might otherwise be developed during translation are eliminated, thereby insuring a high degree of reliability.

Transfer of data from the encoder 14 to preset the counter is initiated by a print command circuit 72 and immediately thereafter, the counter 71 is stepped toward zero by a pulse generator 73 which forms the basic clock reference for the system. The output of the counter is connected to the pulse line 70 (FIG. 8) and therefore such pulses will step the motor 17 to its new type character printing position. At such time, the non-coincidence signal C′ should disappear and the signal C should be generated to stop the motor and effect a print operation. However, in the event of an error, in which case the counter is returned to zero and a "0" signal is applied over line 75 to one input of an "and" gate 74 but the non-coincidence signal C′ is still applied, the gate 74 will be opened to apply a new print command pulse over line 78, causing a new setting of the counter 71 according to the registering position of the print wheel to again step the motor in the proper direction until the proper print position is reached. This sequence of events could conceivably re-occur several times in the event of misadjustment or the like. Thus, an extremely high degree of reliability is achieved.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired to be secured by United States Letters Patent is:

1. A data printer comprising a rotatable print member having type characters therearound,
means including a multi-phase motor for rotating said print member in either direction,
printing means cooperable with said print member for obtaining a printing impression of a selected one of said type characters,
means for receiving signals representative of different ones of said type characters,
means for producing signals representative of said type characters and occurring successively in timed relation to movement of said type characters into cooperative relation with said printing means,
means for comparing a signal received by said receiving means and a signal produced by said last mentioned means for controlling the direction of rotation of said rotating means accordingly,
actuating means including a pulse generator for producing pulses for advancing said motor in either direction and also said print member wherein at least one pulse advances said print member by an increment of one type character, and
means controlled by said comparing means for determining the order of energizing the phase windings of said motor by said last mentioned means whereby to determine the direction of rotation of said print member.

2. A data printer according to claim 1 comprising means controlled by said comparing means for disabling said actuating means when a said type character corresponding to a said character represented by said signal receiving means is in cooperative relation with said printing means.

3. A data printer according to claim 2 comprising means responsive to said disabling means for causing operation of said printing means.

4. A data printer according to claim 1 wherein said comparing means comprises semiconductor means for producing an equality comparison, and
means controlled by said comparing means for causing operation of said printing means in response to said equality comparison.

5. A data printer according to claim 1 comprising means controlled by said comparing means for causing operation of said printing means when a said type character corresponding to a said character represented by said signal receiving means is in cooperative relation with said printing means.

6. A data printer according to claim 1 comprising means controlled by said comparing means for disabling said rotating means when a said type character corresponding to a said character represented by said signal receiving means is in cooperative relation with said printing means.

7. A data printer according to claim 1 comprising means controlled by said comparing means for disabling said rotating means and for causing operation of said printing means when a said type character corresponding to a said character represented by said signal receiving means is in cooperative relation with said printing means.

8. A data printer according to claim 1 comprising means controlled by said comparing means for disabling said rotating means and for causing operation of said printing means when a said type character corresponding to a said character represented by said signal receiving means is in cooperative relation to said printing means, and
means for delaying operation of said printing means until after said printing member has stopped.

9. A data printer according to claim 1 wherein said signal producing means comprises an encoder controlled by said print member for producing signals representative of the said type characters passing in cooperative relation with said printing means,
said type wheel being divided into quadrants,
semiconductor circuit elements controlled by said encoder for representing different quadrants through which said type wheel passes while in cooperative relation with said printing means, and
semiconductor circuit means controlled by said last mentioned means for controlling the direction of rotation of said rotating means.

10. A data printer according to claim 1 wherein said last mentioned means comprises a semiconductor subtraction circuit for subtracting an amount representative of a said type character in cooperative relation with said printing means from an amount representative of a character to be printed, and
semiconductor circuit means responsive to said subtraction circuit upon generation of a borrow expression for causing said rotating means to rotate said print member in a predetermined direction,
said last mentioned means being responsive to said subtraction circuit in the absence of a borrow expression for causing said rotating means to rotate said print member in the opposite direction.

11. A data printer comprising a rotatable print member having type characters therearound,
means including a multi-phase motor for rotating said print member in either direction,
printing means cooperable with said print member for obtaining a printing impression of a selected one of said type characters,
means for receiving signals representative of different ones of said type characters,
means for producing signals representative of said type characters and occurring successively in timed relation to movement of said type characters into cooperative relation with said printing means,
means for comparing a signal received by said receiving means and a signal produced by said last mentioned means for controlling the direction of rotation of said rotating means accordingly,
actuating means including a pulse generator for producing pulses for advancing said motor by increments corresponding to one print character per at least one pulse,
a presettable counter,
means responsive to said print member for setting said counter to represent the position of said print member relative to said printing means,
means responsive to said pulses of the pulse generator for advancing said counter one count for a corresponding number of said pulses and,
means responsive to said counter upon reaching a predetermined count for disabling said actuating means.

12. A data printer according to claim 11 wherein said setting means is effective to set said counter when said print member is in a static condition.

13. A data printer comprising a rotatable print member having type characters therearound,
means including a multi-phase motor for rotating said print member in either direction,
printing means cooperable with said print member for obtaining a printing impression of a selected one of said type characters,
means for receiving signals representative of different ones of said type characters,
means for producing signals representative of said type characters and occurring successively in timed relation to movement of said type characters into cooperative relation with said printing means,
means for comparing a signal received by said receiving means and a signal produced by said last mentioned means for controlling the direction of rotation of said rotating means accordingly,
actuating means including a pulse generator for producing pulses for advancing said motor by increments corresponding to one print character per at least one pulse, a pre-settable counter, means controlled by said print member for setting said counter to represent the position of said print member relative to said printing means, means controlled by said pulses of the pulse generator for advancing said counter, one count for a corresponding number of said pulses, and means responsive to said counter upon reaching a predetermined count for disabling said actuating means.

14. A data printer according to claim 13 comprising a print command circuit for causing operation of said actuating means, and means jointly responsive to said counter upon reaching said predetermined count and to said comparing means when a said type character which is in cooperative relation with said printing means does not correspond to a said type character represented by said signal receiving means for enabling said print command circuit.

References Cited

UNITED STATES PATENTS

| | | | |
|---|---|---|---|
| 1,456,503 | 5/1923 | Heising | 197—49 X |
| 2,814,013 | 11/1957 | Schweighofer | 318—467 |
| 2,823,344 | 2/1958 | Ragland | 318—467 |
| 2,823,345 | 2/1958 | Ragland et al. | 318—467 |
| 2,847,505 | 8/1958 | Kraft et al. | 178—34 |
| 2,884,581 | 4/1959 | Schunemann et al. | 318—467 |
| 2,927,676 | 3/1960 | Abbondanza | 197—6.6 |
| 2,963,924 | 12/1960 | Anderson | 74—819 X |
| 2,989,680 | 6/1961 | Weisereet et al. | 197—6.4 X |
| 3,020,459 | 2/1962 | Feigleson | 318—467 X |
| 3,035,218 | 5/1962 | Varrall | 318—467 |
| 3,062,997 | 11/1962 | Loyd | 318—467 |
| 3,201,514 | 8/1965 | Kleinschmidt et al. | 197—49 X |
| 3,227,258 | 1/1966 | Pannier et al. | 197—6.6 |
| 3,232,404 | 2/1966 | Jones | 101—93 X |
| 3,282,389 | 11/1966 | Rudisch | 197—6.6 |

ROBERT E. PULFREY, *Primary Examiner.*

E. S. BURR, *Assistant Examiner.*